(12) United States Patent
Yamazaki

(10) Patent No.: US 12,448,571 B2
(45) Date of Patent: Oct. 21, 2025

(54) AQUEOUS MICROCAPSULE DISPERSION

(71) Applicant: KAO CORPORATION, Tokyo (JP)

(72) Inventor: Daisuke Yamazaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 687 days.

(21) Appl. No.: 17/789,137

(22) PCT Filed: Dec. 28, 2020

(86) PCT No.: PCT/JP2020/049256
§ 371 (c)(1),
(2) Date: Jun. 24, 2022

(87) PCT Pub. No.: WO2021/132727
PCT Pub. Date: Jul. 1, 2021

(65) Prior Publication Data
US 2023/0107594 A1 Apr. 6, 2023

(30) Foreign Application Priority Data
Dec. 27, 2019 (JP) .................. 2019-239904

(51) Int. Cl.
| C09K 23/18 | (2022.01) |
| B01J 13/06 | (2006.01) |
| C11B 9/00 | (2006.01) |

(52) U.S. Cl.
CPC ............. C09K 23/18 (2022.01); B01J 13/06 (2013.01); C11B 9/0015 (2013.01)

(58) Field of Classification Search
CPC .......... A01P 1/00; A01N 25/04; A01N 25/28; A01N 25/30; C11B 9/0015; B01J 13/22; B01J 13/185; B01J 13/06; B01J 13/046; C09K 23/18; C11D 1/62; C11D 3/505
USPC .......................................... 512/4, 1
See application file for complete search history.

(56) References Cited

U.S. PATENT DOCUMENTS

| 6,534,091 B1 | 3/2003 | Garces Garces et al. |
| 9,763,861 B2 | 9/2017 | Lei et al. |
| 10,046,291 B2 | 8/2018 | Yamazaki |
| 2007/0292676 A1 | 12/2007 | Naigertsik et al. |
| 2014/0106032 A1 | 4/2014 | Dardelle et al. |

FOREIGN PATENT DOCUMENTS

| EP | 1 064 912 A1 | 1/2001 | |
| EP | 1 657 299 A1 | 5/2006 | |
| JP | 2007-500590 A | 1/2007 | |
| JP | 2012-501849 A | 1/2012 | |
| JP | 2012-516371 A | 7/2012 | |
| JP | 2013-530253 A | 7/2013 | |
| JP | 2014-523336 A | 9/2014 | |
| JP | 2015-128762 A | 7/2015 | |
| JP | 2015-200047 A | 11/2015 | |
| JP | 2015200047 A * | 11/2015 | |
| JP | 2016-113510 A | 6/2016 | |
| JP | 2017-114802 A | 6/2017 | |
| WO | WO-2008005693 A2 * | 1/2008 | ......... C11D 17/0039 |
| WO | WO 2015/198829 A1 | 12/2015 | |
| WO | WO 2018/053356 A1 | 3/2018 | |

OTHER PUBLICATIONS

Nakayama et al, JP 2015200047 Machine Translation, Nov. 12, 2015 (Year: 2015).*
International Search Report issued Mar. 30, 2021 in PCT/JP2020/049256 filed Dec. 28, 2020, 3 pages.
U.S. Appl. No. 17/789,104, filed Jun. 24, 2022, Sawada, Risa et al.
U.S. Appl. No. 15/100,909, filed Jun. 1, 2016, U.S. Pat. No. 10,046,291, Yamazaki, Daisuke.
Extended European Search Report issued Oct. 31, 2023 in European Patent Application No. 20908042.3, 8 pages.

* cited by examiner

*Primary Examiner* — Jessica Whiteley
(74) *Attorney, Agent, or Firm* — Oblon, McClelland, Maier &Neustadt, L.L.P.

(57) ABSTRACT

The invention relates to [1] an aqueous microcapsule dispersion containing a component (A): microcapsules each having a shell and a core containing at least one organic compound inside the shell, and a component (B): a surfactant containing a quaternary ammonium salt compound represented by the general formula (1), wherein the ratio by mass of the content of the component (A) to the content of the component (B) [component (A)/component (B)] is 0.1 or more and 20 or less, and [2] a dispersant for microcapsules, containing a surfactant that contains a quaternary ammonium salt compound represented by the general formula (1).

10 Claims, No Drawings

AQUEOUS MICROCAPSULE DISPERSION

CROSS-REFERENCE TO RELATED APPLICATIONS

The present application is a 35 U.S.C. § 371 national stage application of International patent application PCT/JP2020/049256, filed Dec. 28, 2020, which is based on and claims the benefit of priority to Japanese Application No. 2019-239904, filed Dec. 27, 2019. The entire contents of these applications are incorporated herein by reference.

FIELD OF THE INVENTION

The present invention relates to an aqueous microcapsule dispersion and a dispersant for microcapsules for use therein.

BACKGROUND OF THE INVENTION

In a broad business field of cosmetics, medicines, general house products, prints and others, various microcapsules encapsulating a perfume material or a physiologically active substance therein have been developed and utilized. As a production method for such microcapsules, there have been known a chemical method such as a suspension polymerization, a mini-emulsion polymerization method, an emulsion polymerization method, a precipitation polymerization method, a dispersion polymerization method, an interfacial polycondensation method, and a submersible curing method; a physicochemical method such as a submersible drying method, a phase-transfer emulsification method, and a coacervation method; and a mechanical method such as a spray-drying method, and a heteroaggregation method. Many of the microcapsule production methods are methods of obtaining an aqueous dispersion of microcapsules dispersed in an aqueous medium, and from the industrial viewpoint, it is desired to use the resultant aqueous microcapsule dispersion directly as it is without any additional separation operation such as filtration or drying.

However, an aqueous dispersion of microcapsules has a problem that the microcapsules therein may float up or precipitate down depending on the specific gravity difference between the microcapsules and the aqueous medium, or the viscosity of the aqueous medium, or the particle size and the shape of the microcapsules. For example, when the specific gravity of the microcapsules is relatively small to that of the aqueous medium, the aqueous dispersion may cause creaming with time to lose flowability, but when the specific gravity of the microcapsules is relatively large thereto, the aqueous dispersion may precipitate with time to lose flowability.

In addition, the aqueous dispersion of microcapsules has another problem that it may gel owing to physical or chemical change of the surfaces of the shells to constitute the microcapsules or the components contained in the aqueous medium also to lose flowability.

Against such problems, various investigations have heretofore been made.

WO2018/053356A (PTL 1) aims at enhancing the dispersion stability of a microcapsule composition with a viscosity modifier, and describes a microcapsule composition containing microcapsules dispersed in an aqueous phase and a viscosity modifier, in which the viscosity modifier is an acrylate copolymer, a cationic acrylamide copolymer or a polysaccharide.

JP2016-113510A (PTL 2) aims at providing a thixotropy-imparting agent having a low viscosity at high shearing for preventing separation in suspending capsule particles and a liquid detergent composition blended with the thixotropy-imparting agent having a high viscosity at low shearing, and describes a thixotropy-imparting agent containing an aliphatic acid glyceride having a hydroxy group in the aliphatic acyl group, a nonionic surfactant and water, and optionally containing an anionic surfactant.

JP2012-516371A (PTL 3) aims at preparing an inclusion that does not concentrate in a specific region of a fluid, and describes an inclusion containing a core that contains a beneficial agent and a shell that partly surrounds the core, in which the inclusion further contains a viscosity balance regulator.

JP2013-530253A (PTL 4) aims at providing core/shell-type microcapsules containing an aroma material composition in the core for controlling delivery and release of an aroma material and other beneficial chemical substance, and describes microcapsules containing an aroma material composition in the core, in which the density and/or c Log P of the components constituting the aroma material composition contained in the core are controlled each to fall within a specific range.

JP2012-501849A (PTL 5) aims at improving stability of an aqueous suspension of microcapsules having a silicate shell, and describes an aqueous suspension of microcapsules having a silicate shell that uses an organic functional silane as a colloidal silicate hindering agent.

U.S. Pat. No. 9,763,861B (PTL 6) describes a flowable and stable silica capsule composition, which is composed of a silica capsule suspension and adjuvant and in which a cationic polymer such as a vinyl pyrrolidone/dimethylaminoethyl methacrylate copolymer is used as the adjuvant.

SUMMARY OF THE INVENTION

The present invention relates to an aqueous microcapsule dispersion containing the following component (A) and component (B), wherein:

the ratio by mass of the content of the component (A) to the content of the component (B) [component (A)/component (B)] is 0.1 or more and 20 or less, Component (A): microcapsules each having a shell and a core containing at least one organic compound inside the shell, Component (B): a surfactant containing a quaternary ammonium salt compound represented by the following general formula (1):

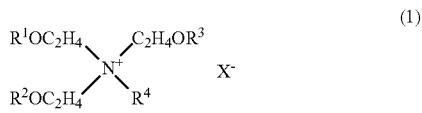

(1)

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and $X^-$ represents an anion, provided that at least one of $R^1$, $R^2$ and R³ is an acyl group derived from a fatty acid having 12 or more and 30 or less carbon atoms.

DETAILED DESCRIPTION OF THE INVENTION

In the techniques of PTLs 1 to 5, the dispersion stability of the microcapsules in the aqueous dispersion was insufficient.

The technique of PTL 2 is a technique such that crystals of a fatty acid glyceride have a form of spherical crystals in a water-containing phase by a nonionic surfactant and optionally an anionic surfactant, and therefore impart a thixotropic nature to the liquid detergent composition, in which, however, the stability of the encapsulated component in the microcapsules may be lowered by the surfactant that constitutes the spherical crystal particles to impart a thixotropic nature. Consequently, it is desired to improve the dispersion stability of microcapsules not depending on the action of such a structure that imparts a thixotropic nature.

PTL 4 is a technique of controlling the density and/or c Log P of the components constituting the aroma material composition contained in the core of microcapsules each to fall within a specific range, in which, therefore, the latitude in planning the composition of the encapsulated components in the core is limited.

In addition, since the microcapsules can be finally released in the natural environment, surface modification of silicate shell microcapsules and colloidal silicate particles with an organic functional silane, like the technique of PTL 5, leads to emission of hardly-decomposable components in the natural environment. Further, even when a cationic polymer is used like in PTL 6, it is undesirable since there is concern about toxicity to aquatic organisms.

As described above, though microcapsules are used in a broad business field, there are no microcapsules that are sufficiently satisfactory from the viewpoints of ease of handling as an aqueous dispersion thereof and influence on the natural environment. Consequently, there is a demand for an aqueous dispersion of microcapsules having a high dispersion stability in which the load on the natural environment thereof as an aqueous dispersion is small, gelation is suppressed even when the aqueous dispersion is stored for a long period of time, and reduction in flowability due to floating or precipitation is suppressed.

The present invention relates to an aqueous dispersion of microcapsules excellent in dispersion stability and capable of satisfying both easiness in handleability as an aqueous dispersion and low environmental load, and to a dispersant for microcapsules for use therein.

The present inventor has noted that, by using a surfactant containing a specific quaternary ammonium salt compound as a dispersant for microcapsules, the dispersion stability of microcapsules in an aqueous dispersion can be improved, and has found that an aqueous dispersion of microcapsules excellent in dispersion stability and capable of satisfying both easiness in handleability as an aqueous dispersion and low environmental load, and a dispersant for microcapsules for use therein can be provided.

Specifically, the present invention relates to the following [1] and [2].

[1] An aqueous microcapsule dispersion containing the following component (A) and component (B), wherein:

the ratio by mass of the content of the component (A) to the content of the component (B) [component (A)/component (B)] is 0.1 or more and 20 or less, Component (A): microcapsules each having a shell and a core containing at least one organic compound inside the shell, Component (B): a surfactant containing a quaternary ammonium salt compound represented by the following general formula (1):

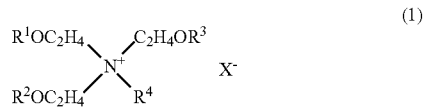

(1)

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and $X^-$ represents an anion, provided that at least one of $R^1$, $R^2$ and $R^3$ is an acyl group derived from a fatty acid having 12 or more and 30 or less carbon atoms.

[2] A dispersant for microcapsules, containing a surfactant that contains a quaternary ammonium salt compound represented by the following general formula (1):

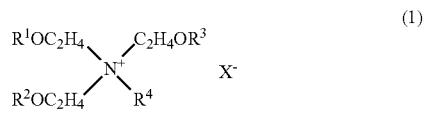

(1)

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and $X^-$ represents an anion, provided that at least one of $R^1$, $R^2$ and $R^3$ is an acyl group derived from a fatty acid having 12 or more and 30 or less carbon atoms.

According to the present invention, there can be provided an aqueous dispersion of microcapsules excellent in dispersion stability and capable of satisfying both easiness in handleability as an aqueous dispersion and low environmental load, and a dispersant for microcapsules for use therein.

[Aqueous Microcapsule Dispersion]

The aqueous microcapsule dispersion of the present invention contains the following component (A) and component (B), wherein the ratio by mass of the content of the component (A) to the content of the component (B) [component (A)/component (B)] is 0.1 or more and 20 or less.

Component (A): microcapsules each having a shell and a core containing at least one organic compound inside the shell.

Component (B): a surfactant containing a quaternary ammonium salt compound represented by the following general formula (1):

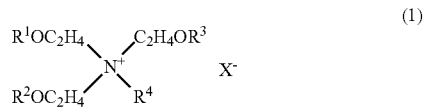

(1)

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and X⁻ represents an anion, provided that at least one of $R^1$, $R^2$ and $R^3$ is an acyl group derived from a fatty acid having 12 or more and 30 or less carbon atoms.

The aqueous microcapsule dispersion of the present invention is such that microcapsules of the component (A) are dispersed in an aqueous medium.

In the present specification, the "aqueous medium" is a liquid containing at least water, and is preferably one containing water as a main ingredient. The other ingredients than water that the aqueous medium can contain include aliphatic alcohols having 1 or more and 4 or less carbon atoms; ketones having 3 more and 8 or less carbon atoms; ethers such as ethyl ether, propyl ether, butyl ether and tetrahydrofuran; and esters such a methyl acetate and ethyl acetate.

In the present specification, the "fatty acid having 12 or more carbon atoms" may also be referred to as a higher fatty acid.

Though not clear, the reason why the effect of the present invention can be attained is considered as follows.

The quaternary ammonium salt compound represented by the general formula (1) contains, in the structure thereof, a hydrophilic moiety due to the quaternary ammonium group and a hydrophobic moiety due to the higher fatty acid-derived acyl group, and is therefore considered to form fine vesicles in an aqueous medium. With that, it is considered that the vesicles may cause some interaction with the microcapsules in the aqueous dispersion to suppress aggregation of microcapsules and, as a result, the dispersion stability of the aqueous microcapsule dispersion can be thereby improved.

<Component (A)>

The component (A) is microcapsules each having a shell and a core containing at least one organic compound inside the shell.

Not specifically limited, the shell to constitute the microcapsules of the component (A) may be any one capable of encapsulating therein a core that contains at least one organic compound. Specific examples of the components to constitute the shell include silica, organic-modified silicas, polyvinyl alcohols, polysaccharides, lipids, polylactic acid resins, polyglycol acid resins and other polyesters, polyacrylate-based copolymers, polymethacrylate-based polymers, melamine/formaldehyde resins, polyurethane resins, polyurea resins, polyamide resins, polyimide resins, polystyrenes, and combinations thereof. Among these, from the viewpoint of stably trapping the materials to be encapsulated within the shell, those having a crosslinked structure are preferred, and as specific examples thereof, one or more selected from the group consisting of silica, organic-modified silicas, melamine/formaldehyde resins, polyurethane resins, polyurea resins, polyamide resins and polyimide resins are preferred, and from the viewpoint of reducing environmental load when released in the external environments, silica is more preferred. Namely, the component (A) is preferably microcapsules each having a shell that contains silica as the constituent component and having a core that contains at least one organic compound inside the shell (hereinafter this may be referred to as "silica capsules").

The silica capsules having a shell that contains silica as the constituent component can be produced, for example, according to a method of (1) sol-gel reaction with an alkoxysilane as a starting material, (2) sol-gel reaction with sodium silicate as a starting material, or (3) formation of a Pickering emulsion with a colloidal silica as a starting material.

The median diameter $D_{50}$ of the microcapsules of the component (A) is, from the viewpoint of improving dispersion stability based on the Stokes' equation, preferably 100 μm or less, more preferably 75 μm or less, even more preferably 50 μm or less, further more preferably 30 μm or less, further more preferably 10 μm or less. From the viewpoint of reducing the specific surface area of the microcapsules to improve the retentiveness of the materials to be encapsulated in the core, the median diameter is preferably 0.01 μm or more, more preferably 0.05 μm or more, even more preferably 0.07 μm or more, further more preferably 0.1 μm or more, further more preferably 0.5 μm or more, further more preferably 1 μm or more. The median diameter $D_{50}$ of the component (A) can be measured according to the method described in the section of Examples.

The difference in specific gravity between the component (A) and the aqueous medium is, from the viewpoint of preventing the microcapsules from floating up or precipitating down with time to thereby improve dispersion stability, preferably less than 0.30, more preferably less than 0.20, even more preferably less than 0.15, further more preferably less than 0.10, further more preferably less than 0.05, further more preferably less than 0.01, and especially more preferably, there is no specific gravity difference therebetween.

The specific gravity of the component (A) can be determined by the specific gravity of the shell and the core constituting the component (A) and the ratio by mass of the shell to the core.

The organic compound contained in the core of the component (A) is preferably at least one material selected from the group consisting of a fragrance material; a fragrance precursor; an oil; an antioxidant; an antibacterial agent; a fertilizer; a surface modifier for fibers, skin and hair, etc.; a cooling sensation agent; a dye; a color matter; a silicone; a solvent; and an oil-soluble polymer, more preferably at least one material selected from the group consisting of a fragrance material, a fragrance precursor, an oil, an antioxidant, an antibacterial agent, a fertilizer, a surface modifier, and a solvent, even more preferably at least one material selected from the group consisting of a fragrance material, a fragrance precursor, an oil, an antioxidant, and a solvent, further more preferably at least one material selected from the group consisting of a fragrance material, a fragrance precursor and an oil, further more preferably at least one material selected from the group consisting of a fragrance material and a fragrance precursor.

The organic compounds can be appropriately combined in accordance with the use of the microcapsules.

The fragrance precursor includes a compound that reacts with water to release a fragrance component, and a compound that reacts with light to release a fragrance component.

The compound that reacts with water to release a fragrance component includes a silicate compound having an alkoxy component derived from a fragrance alcohol, a fatty acid ester compound having an alkoxy component derived from a fragrance alcohol, an acetal compound or a hemiacetal compound obtained by reaction of a carbonyl component derived from a fragrance aldehyde or a fragrance ketone and an alcohol compound, a Schiff base compound obtained by reaction of a carbonyl component derived from a fragrance aldehyde or a fragrance ketone and a primary amine compound, and a hemiaminal compound or hydrazone compound obtained by reaction of a carbonyl component derived from a fragrance aldehyde or a fragrance ketone and a hydrazine compound.

The compound that reacts with light to release a fragrance component includes a 2-nitrobenzyl ether compound having an alkoxy component derived from a fragrance alcohol, an α-keto-ester compound having a carbonyl component derived from a fragrance aldehyde or fragrance ketone, and a coumarate compound having an alkoxy compound derived from a fragrance alcohol. These fragrance precursors can be used as a polymer of, for example, a reaction product of some carboxy groups of a polyacrylic acid and a fragrance alcohol.

The organic compound preferably has appropriate hydrophobicity, from the viewpoint of dispersion stability of microcapsules. As an index to indicate the hydrophilicity or hydrophobicity of the organic compound, a c Log P value that is a calculated value of a common logarithm "log P" of a partition coefficient P between n-octanol and water (n-octanol/water) can be used. The c Log P value is a "Log P (c Log P)" calculated according to the method described in A. Leo Comprehensive Medicinal Chemistry, Vol. 4 C. Hansch, P. G. Sammens, J. B Taylor and C. A. Ramsden, Eds., p. 295, Pergamon Press, 1990, and is a c Log P value calculated by Program C LOG P v. 4.01.

In the case where the organic compound is composed of plural constituent components, the c Log P value of the organic compound can be determined by multiplying the c Log P value of each constituent component by the volume ratio of each constituent component, and summing up the resultant data.

The c Log P value of the organic compound is preferably 1 or more, more preferably 2 or more, even more preferably 3 or more, further more preferably 4 or more, and is preferably 30 or less, more preferably 20 or less, even more preferably 10 or less.

<Component (B)>

The component (B) is a surfactant containing a quaternary ammonium salt compound represented by the following general formula (1).

In the present invention, the component (B) can be used as a dispersant for microcapsules.

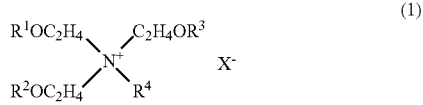

(1)

In the general formula (1), $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and $X^-$ represents an anion. However, at least one of $R^1$, $R^2$ and $R^3$ is an acyl group derived from a fatty acid having 12 or more and 30 or less carbon atoms.

In the general formula (1), the carbon number of the acyl group represented by $R^1$, $R^2$ and $R^3$ is, from the viewpoint of dispersion stability of microcapsules, each independently 12 or more, preferably 14 or more, more preferably 16 or more, and is 30 or less, preferably 28 or less, more preferably 26 or less, even more preferably 22 or less.

From the viewpoint of easiness in handleability owing to the flowability of the quaternary ammonium salt compound, the acyl group that constitutes the quaternary ammonium salt compound preferably contains an acyl group derived from a fatty acid containing a carbon-carbon unsaturated bond. The carbon-carbon unsaturated bond is preferably a double bond. The amount of the acyl group derived from the carbon-carbon unsaturated bond-containing fatty acid in all the acyl groups constituting the quaternary ammonium salt compound is, from the viewpoint of improving dispersion stability of microcapsules, and from the viewpoint of the retentiveness of the encapsulated organic compound such as a fragrance material, preferably 20% by mass or more, more preferably 40% by mass or more, even more preferably 60% by mass or more, further more preferably 80% by mass or more, and is preferably 100% by mass or less.

The acyl group includes an acyl group derived from a saturated fatty acid such as lauric acid, tridecylic acid, myristic acid, pentadecylic acid, palmitic acid, margaric acid, stearic acid, and dimethyloctanoic acid; and an acyl group derived from an unsaturated fatty acid such as dodecenoic acid, tetradecenoic acid, hexadecenoic acid, oleic acid, vaccenic acid, linoleic acid, linolenic acid, and elaidic acid. Among these, from the viewpoint of improving dispersion stability of microcapsules, and from the viewpoint of the retentiveness of the encapsulated organic compound such as a fragrance material, preferably contained is an acyl group derived from at least one fatty acid selected from the group consisting of oleic acid, linoleic acid, linolenic acid, lauric acid, myristic acid, palmitic acid and stearic acid, more preferably contained is an acyl group derived from at least one fatty acid selected from the group consisting of oleic acid, linoleic acid, linolenic acid, lauric acid and stearic acid is contained, and even more preferably contained is an acyl group derived from at least one fatty acid selected from the group consisting of oleic acid, linoleic acid and linolenic acid.

The acyl group preferably contains an acyl group derived from at least one fatty acid selected from the group consisting of oleic acid, linoleic acid and linolenic acid. With that, the dispersion stability of microcapsules can be improved, and the retentiveness of the encapsulated organic compound such as a fragrance material at high temperatures can also be improved. From these viewpoints, the total ratio of the acyl groups derived from oleic acid, linoleic acid and linolenic acid in all the acyl groups constituting the quaternary ammonium salt compound is preferably 25% by mass or more, more preferably 30% by mass or more, even more preferably 40% by mass or more, further more preferably 50% by mass or more, further more preferably 60% by mass or more, further more preferably 70% by mass or more, further more preferably 80% by mass or more, further more preferably 90% by mass or more, and is preferably 100% by mass or less.

In the case where the acyl group contains an acyl group derived from oleic acid, the proportion of the oleic acid-derived acyl groups in all the acyl groups constituting the quaternary ammonium salt compound is, from the viewpoint of improving dispersion stability of microcapsules, and from the viewpoint of the retentiveness of the encapsulated organic compound such as a fragrance material at high temperatures, preferably 20% by mass or more, more preferably 30% by mass or more, even more preferably 40% by mass or more, further more preferably 50% by mass or more, further more preferably 60% by mass or more, further more preferably 70% by mass or more, and is preferably 100% by mass or less.

In the general formula (1), $R^4$ is preferably a methyl group or an ethyl group, more preferably a methyl group.

In the general formula (1), $X^-$ is an organic or inorganic anion, and is preferably at least one selected from the group consisting of a halide ion such as a chloride ion, an alkyl sulfate ion having 1 or more and 3 or less carbon atoms, and a benzenesulfonate ion optionally substituted with 1 or more and 3 or less alkyl groups each having 1 or more and 3 or less carbon atoms, more preferably an alkyl sulfate ion having 1 or more and 3 or less carbon atoms, even more preferably a methyl sulfate ion or an ethyl sulfate ion, further more preferably a methyl sulfate ion.

The quaternary ammonium salt compound is a quaternary compound of a triethanolamine fatty acid ester, and is composed of three different quaternary compounds each having an acylation degree of 1, 2 or 3.

The average acylation degree of the quaternary ammonium salt compound is, from the viewpoint of dispersion stability of microcapsules, preferably 1,3 or more, more preferably 1.5 or more, and is preferably 2.5 or less, more preferably 2.3 or less. The average acylation degree can be controlled by the reaction ratio of a fatty acid and a triethanolamine and the reaction ratio and the reaction condition with the alkylating agent in quaternization.

The proportion of the quaternary compounds each having a different acylation degree to constitute the quaternary ammonium salt compound is, from the viewpoint of improving dispersion stability of microcapsules, and from the viewpoint of the retentiveness of the encapsulated organic compound such as a fragrance material at high temperatures, preferably as mentioned below.

The proportion of a compound having an acylation degree of 1, that is, a compound (b1) of the general formula (1) where $R^1$ is an acyl group and $R^2$ and $R^3$ are hydrogen atoms (hereinafter referred to as "component (b1)") is, in the total amount of the quaternary ammonium salt compound, preferably 5% by mass or more, more preferably 10% by mass or more, even more preferably 15% by mass or more, and is preferably 45% by mass or less, more preferably 40% by mass or less, even more preferably 35% by mass or less.

The proportion of a compound having an acylation degree of 2, that is, a compound (b2) of the general formula (1) where $R^1$ and $R^2$ each are an acyl group and $R^3$ is a hydrogen atom (hereinafter referred to as "component (b2)") is, in the total amount of the quaternary ammonium salt compound, preferably 30% by mass or more, more preferably 35% by mass or more, even more preferably 40% by mass or more, further more preferably 50% by mass or more, and is preferably 75% by mass or less, more preferably 70% by mass or less, even more preferably 65% by mass or less.

The proportion of a compound having an acylation degree of 3, that is, a compound (b3) of the general formula (1) where $R'$, $R^2$ and $R^3$ each are an acyl group (hereinafter referred to as "component (b3)") is, in the total amount of the quaternary ammonium salt compound, preferably 5% by mass or more, more preferably 8% by mass or more, even more preferably 10% by mass or more, and is preferably 40% by mass or less, more preferably 30% by mass or less, even more preferably 25% by mass or less.

The quaternary ammonium salt compound can be produced by quaternizing an esterification product, which is obtained by a method of dehydrating esterification of a higher fatty acid and a triethanolamine, or a method of interesterification of a higher fatty acid lower alkyl ester (where the lower alkyl group is a methyl group, an ethyl group, a propyl group) and triethanolamine, with an alkylating agent. The alkylating agent is preferably a methyl chloride or a dimethyl sulfate.

For producing a mixture that satisfies the above-mentioned range for the proportion of the component (b1) to the component (b3) in the quaternary ammonium salt compound, for example, it is preferable that a mixture of triethanolamine higher fatty acid esters prepared by reacting a higher fatty acid or a higher fatty acid lower alkyl ester with a triethanolamine in a ratio of preferably 1.3 mols or more, more preferably 1.5 mols or more, and preferably 2.0 mols or less, more preferably 1.95 mols or less, relative to 1 mol of the triethanolamine, is quaternized.

Regarding the quaternization, for example, in the case where dimethyl sulfate is used as an alkylating agent, preferably dimethyl sulfate is used in an amount of 0.9 equivalents or more, more preferably 0.95 equivalents or more, and preferably 1.1 equivalents or less, more preferably 0.99 equivalents or less, relative to one equivalent of the amino group of the ester compound.

The higher fatty acid or the higher fatty acid lower alkyl ester is preferably one having a fatty acid composition produced by saponifying oils or fats such as beef tallow, palm oil, sunflower oil, soybean oil, rape seed oil, safflower oil, cotton seed oil, corn oil, and olive oil, and from the viewpoint of dispersion stability of microcapsules, more preferred is one having a fatty acid composition obtained from beef tallow, palm oil and sunflower oil.

The higher fatty acid or the higher fatty acid lower alkyl ester contains a large amount of alkenyl groups each having 2 or more carbon-carbon unsaturated bonds, and therefore can be produced, for example, by a method of crystallization as described in JPH4-306296A, or a method of reduced-pressure distillation of a methyl ester as described in JPH6-41578A.

The quaternary ammonium salt compound is, from the viewpoint of maintaining good dispersion stability of microcapsules even at a temperature in treating the aqueous dispersion thereof and at a temperature in storing the aqueous dispersion, preferably liquid within a range of 20° C. or higher and 50° C. or lower, more preferably liquid within a range of 15° C. or higher and 45° C. or lower, even more preferably liquid within a range of 10° C. or higher and 40° C. or lower, further more preferably liquid within a range of 10° C. or higher and 35° C. or lower.

The component (B) for use in the present invention may contain any other surfactant than the quaternary ammonium salt compound within a range not detracting from the advantageous effects of the present invention. The other surfactant includes a cationic surfactant except the quaternary ammonium salt compound, a nonionic surfactant, an anionic surfactant and an ampholytic surfactant.

In the present invention, the content of the quaternary ammonium salt compound in the component (B) is, from the viewpoint of dispersion stability of microcapsules, preferably 70% by mass or more, more preferably 80% by mass or more, even more preferably 90% by mass or more, further more preferably 95% by mass or more, and is preferably 100% by mass or less, more preferably 100% by mass. Namely, in the case where the component (B) is used as a dispersant for microcapsules, the microcapsule dispersant is preferably composed of the quaternary ammonium salt compound.

The aqueous dispersion of the present invention may optionally contain, as needed, any other component than the component (A) and the component (B). The other component includes a pH regulator, a color matter, a preservative, an antioxidant, a UV absorbent, a shell surface modifier, an inorganic salt, a tackifier, a deposition auxiliary agent, a rheology regulator.

The aqueous dispersion of the present invention may previously contain, as needed for blending the aqueous dispersion in various preparations, any of a fabric softener, a fabric freshening agent, a fabric strengthening agent, an enzyme, a builder, a hair conditioning agent, a skin conditioning agent, a fragrance material, a clay, a zeolite and a silicone, other than the component (A) and the component (B).

(Production Method for Aqueous Microcapsule Dispersion)

The production method for the aqueous dispersion of the present invention is not specifically limited. For example, an aqueous dispersion containing the component (A) previously prepared, the component (B) and the above-mentioned other optional components may be mixed using a known stirring device to produce the aqueous dispersion of the present invention.

The temperature at which the component (A)-containing aqueous dispersion and the component (B) are mixed is, from the viewpoint of dispersion stability of microcapsules, and from the viewpoint of the retentiveness of the encapsulated organic compound such as a fragrance material, preferably 15° C. or higher, more preferably 20° C. or higher, and is preferably 35° C. or lower, more preferably 30° C. or lower.

(Composition of Aqueous Microcapsule Dispersion)

The content of the component (A) in the aqueous dispersion of the present invention is, from the viewpoint of reducing the viscosity of the aqueous dispersion to improve the handleability thereof, preferably 50% by mass or less, more preferably 40% by mass or less, even more preferably 30% by mass or less, further more preferably 25% by mass or less, and is, from the viewpoint of facilitating preparation of liquid compositions or products using the aqueous dispersion, preferably 3% by mass or more, more preferably 5% by mass or more, even more preferably 8% by mass or more, further more preferably 10% by mass or more, further more preferably 15% by mass or more.

The content of the component (B) in the aqueous dispersion of the present invention is, from the viewpoint of suppressing aggregation of microcapsules in the aqueous dispersion to reduce the viscosity of the aqueous dispersion and to improve the handleability thereof, preferably 40% by mass or less, more preferably 30% by mass or less, even more preferably 20% by mass or less, further more preferably 10% by mass or less, further more preferably 7% by mass or less, further more preferably 5% by mass or less, further more preferably 4% by mass or less, and is, from the viewpoint of dispersion stability of microcapsules, preferably 0.1% by mass or more, more preferably 0.5% by mass or more, even more preferably 1% by mass or more, further more preferably 1.5% by mass or more, further more preferably 2% by mass or more.

The ratio by mass of the content of the component (A) to the content of the component (B) in the aqueous dispersion of the present invention [component (A)/component (B)] (hereinafter this may be simply referred to as "mass ratio [component (A)/component (B)]") is, from the viewpoint of dispersion stability of microcapsules, preferably 0.1 or more, more preferably 1 or more, even more preferably 2 or more, further more preferably 3 or more, further more preferably 4 or more, further more preferably 5 or more, and is, from the viewpoint of developing the effect of the organic compound contained in the core of microcapsules, preferably 20 or less, more preferably 15 or less, even more preferably 12 or less, further more preferably 10 or less, further more preferably 9 or less, further more preferably 8 or less.

Accordingly, as one example of the condition, the mass ratio [component (A)/component (B)] is preferably 1 or more and 15 or less, more preferably 2 or more and 12 or less, even more preferably 2 or more and 10 or less, further more preferably 2 or more and 9 or less, further more preferably 2 or more and 8 or less, further more preferably 3 or more and 8 or less, further more preferably 4 or more and 8 or less, further more preferably 5 or more and 8 or less.

The content of the quaternary ammonium salt compound in the aqueous dispersion of the present invention is, from the viewpoint of suppressing aggregation of microcapsules in the aqueous dispersion to reduce the viscosity of the aqueous dispersion and to improve the handleability thereof, preferably 40% by mass or less, more preferably 30% by mass or less, even more preferably 20% by mass or less, further more preferably 10% by mass or less, further more preferably 7% by mass or less, further more preferably 5% by mass or less, further more preferably 4% by mass or less, and is, from the viewpoint of dispersion stability of microcapsules, preferably 0.1% by mass or more, more preferably 0.5% by mass or more, even more preferably 1% by mass or more, further more preferably 1.5% by mass or more, further more preferably 2% by mass or more.

The content of the quaternary ammonium salt compound relative to the organic compound contained in the core of the component (A) in the aqueous dispersion of the present invention is, from the viewpoint of dispersion stability of microcapsules, preferably 0.5% by mass or more, more preferably 1% by mass or more, even more preferably 2% by mass or more, further more preferably 3% by mass or more, further more preferably 5% by mass or more, further more preferably 10% by mass or more, and is, from the viewpoint of the efficiency of the aqueous microcapsule dispersion, preferably 40% by mass or less, more preferably 30% by mass or less, even more preferably 25% by mass or less, further more preferably 20% by mass or less.

The viscosity at 25° C. of the aqueous microcapsule dispersion of the present invention is preferably 1 mPa·s or more, more preferably 5 mPa·s or more, even more preferably 10 mPa·s or more, and is preferably 4,000 mPa·s or less, more preferably 2,000 mPa·s or less, even more preferably 1,000 mPa·s or less, further more preferably 500 mPa·s or less, further more preferably 100 mPa·s or less, further more preferably 50 mPa·s or less, further more preferably 30 mPa·s or less. The viscosity at 25° C. of the aqueous microcapsule dispersion can be measured according to the method described in the section of Examples.

The aqueous microcapsule dispersion and the dispersant for microcapsules of the present invention satisfy both easy handleability and low environmental load, and can therefore be used in various applications. Examples of the applications include cosmetic materials such as milk, cosmetic fluid, lotion, essence liquid, cream, gel formulation, hair treatment agent, and quasi-drugs, fiber treatment agents such as detergent, softener, and antiwrinkle spray, hygiene products such as paper diaper, and aromatic materials and other various applications, and the aqueous microcapsule dispersion and the dispersant for microcapsules of the present invention are favorably used for such applications.

The aqueous microcapsule dispersion and the dispersant for microcapsules of the present invention are preferably used as contained or blended in a liquid composition such as a detergent composition, a fiber treatment composition, a cosmetic composition, an aromatic composition, and a deodorant composition. The composition is preferably a detergent composition such as a powdery detergent composition, and a liquid detergent composition; and a fiber treatment composition such as a softener composition, more preferably a fiber treatment composition, even more preferably a softener composition.

Regarding the above-mentioned embodiments, the present invention further discloses the following aqueous microcapsule dispersion and dispersant for microcapsules.

<1> An aqueous microcapsule dispersion containing the following component (A) and component (B), wherein:

the ratio by mass of the content of the component (A) to the content of the component (B) [component (A)/component (B)] is 0.1 or more and 20 or less, Component (A): microcapsules each having a shell and a core containing at least one organic compound inside the shell, Component (B): a surfactant containing a quaternary ammonium salt compound represented by the following general formula (1):

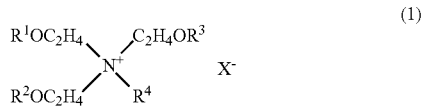

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and $X^-$ represents an anion, provided that at least one of $R^1$, $R^2$ and $R^3$ is an acyl group derived from a fatty acid having 12 or more and 30 or less carbon atoms.

<2> The aqueous microcapsule dispersion according to the above <1>, wherein the component (A) is microcapsules each having a shell containing silica as a constituent component and a core containing at least one organic compound inside the shell.

<3> The aqueous microcapsule dispersion according to the above <1>, wherein the shell constituting the microcapsules of the component (A) is silica.

<4> The aqueous microcapsule dispersion according to any of the above <1> to <3>, wherein the median diameter $D_{50}$ of the microcapsules of the component (A) is preferably 100 μm or less, more preferably 75 μm or less, even more preferably 50 μm or less, further more preferably 30 μm or less, further more preferably 10 μm or less, and is preferably 0.01 μm or more, more preferably 0.05 μm or more, even more preferably 0.07 μm or more, further more preferably 0.1 μm or more, further more preferably 0.5 μm or more, further more preferably 1 μm or more.

<5> The aqueous microcapsule dispersion according to any of the above <1> to <4>, wherein the quaternary ammonium salt compound is preferably liquid within a range of 20° C. or higher and 50° C. or lower, more preferably liquid within a range of 15° C. or higher and 45° C. or lower, even more preferably liquid within a range of 10° C. or higher and 40° C. or lower, further more preferably liquid within a range of 10° C. or higher and 35° C. or lower.

<6> The aqueous microcapsule dispersion according to any of the above <1> to <5>, wherein the total ratio of the acyl groups derived from oleic acid, linoleic acid and linolenic acid in all the acyl groups constituting the quaternary ammonium salt compound is preferably 25% by mass or more, more preferably 30% by mass or more, even more preferably 40% by mass or more, further more preferably 50% by mass or more, further more preferably 60% by mass or more, further more preferably 70% by mass or more, further more preferably 80% by mass or more, further more preferably 90% by mass or more, and is preferably 100% by mass or less.

<7> The aqueous microcapsule dispersion according to any of the above <1> to <6>, wherein the proportion of the oleic acid-derived acyl groups in all the acyl groups constituting the quaternary ammonium salt compound is preferably 20% by mass or more, more preferably 30% by mass or more, even more preferably 40% by mass or more, further more preferably 50% by mass or more, further more preferably 60% by mass or more, further more preferably 70% by mass or more, and is preferably 100% by mass or less.

<8> The aqueous microcapsule dispersion according to any of the above <1> to <7>, wherein the content of the component (A) in the aqueous microcapsule dispersion is preferably 50% by mass or less, more preferably 40% by mass or less, even more preferably 30% by mass or less, further more preferably 25% by mass or less, and is preferably 3% by mass or more, more preferably 5% by mass or more, even more preferably 8% by mass or more, further more preferably 10% by mass or more, further more preferably 15% by mass or more.

<9> The aqueous microcapsule dispersion according to any of the above <1> to <8>, wherein the content of the component (B) in the aqueous microcapsule dispersion is preferably 40% by mass or less, more preferably 30% by mass or less, even more preferably 20% by mass or less, further more preferably 10% by mass or less, further more preferably 7% by mass or less, further more preferably 5% by mass or less, further more preferably 4% by mass or less, and is preferably 0.1% by mass or more, more preferably 0.5% by mass or more, even more preferably 1% by mass or more, further more preferably 1.5% by mass or more, further more preferably 2% by mass or more.

<10> The aqueous microcapsule dispersion according to any of the above <1> to <9>, wherein the content of the quaternary ammonium salt compound in the aqueous microcapsule dispersion is preferably 40% by mass or less, more preferably 30% by mass or less, even more preferably 20% by mass or less, further more preferably 10% by mass or less, further more preferably 7% by mass or less, further more preferably 5% by mass or less, further more preferably 4% by mass or less, and is preferably 0.1% by mass or more, more preferably 0.5% by mass or more, even more preferably 1% by mass or more, further more preferably 1.5% by mass or more, further more preferably 2% by mass or more.

<11> The aqueous microcapsule dispersion according to any of the above <1> to <10>, wherein the ratio by mass of the content of the component (A) to the content of the component (B) in the aqueous microcapsule dispersion [component (A)/component (B)] is preferably 1 or more, more preferably 2 or more, even more preferably 3 or more, further more preferably 4 or more, further more preferably 5 or more, and is preferably 15 or less, more preferably 12 or less, even more preferably 10 or less, further more preferably 9 or less, further more preferably 8 or less.

<12> The aqueous microcapsule dispersion according to any of the above <1> to <10>, wherein the ratio by mass of the content of the component (A) to the content of the component (B) in the aqueous microcapsule dispersion [component (A)/component (B)] is preferably 1 or more and 15 or less, more preferably 2 or more and 12 or less, even more preferably 2 or more and 10 or less, further more preferably 2 or more and 9 or less, further more preferably 2 or more and 8 or less, further more preferably 3 or more and 8 or less, further more preferably 4 or more and 8 or less, further more preferably 5 or more and 8 or less.

<13> The aqueous microcapsule dispersion according to any of the above <1> to <12>, wherein the viscosity at 25° C. of the aqueous microcapsule dispersion is preferably 1 mPa·s or more, more preferably 5 mPa·s or more, even more preferably 10 mPa·s or more, and is preferably 4,000 mPa·s or less, more preferably 2,000 mPa·s or less, even more preferably 1,000 mPa·s or less, further more preferably 500 mPa·s or less, further more preferably 100 mPa·s or less, further more preferably 50 mPa·s or less, further more preferably 30 mPa·s or less.

<14> The aqueous microcapsule dispersion according to any of the above <1> to <13>, wherein the organic compound contained in the core of the component (A) is preferably at least one material selected from the group consisting of a fragrance material; a fragrance precursor; an oil; an antioxidant; an antibacterial agent; a fertilizer; a surface modifier for fibers, skin and hair, etc.; a cooling sensation agent; a dye; a color matter; a silicone; a solvent; and an oil-soluble polymer, more preferably at least one material selected from the group consisting of a fragrance material, a fragrance precursor, an oil, an antioxidant, an antibacterial agent, a fertilizer, a surface modifier, and a solvent, even more preferably at least one material selected from the group consisting of a fragrance material, a fragrance precursor, an oil, an antioxidant, and a solvent, further more preferably at least one material selected from the group consisting of a fragrance material, a fragrance precursor and an oil, further more preferably at least one material selected from the group consisting of a fragrance material and a fragrance precursor.

<15> The aqueous microcapsule dispersion according to any of the above <1> to <14>, wherein the c Log P value of the organic compound contained in the core of the component (A) is preferably 1 or more, more preferably 2 or more, even more preferably 3 or more, further more preferably 4 or more, and is preferably 30 or less, more preferably 20 or less, even more preferably 10 or less.

<16> An aqueous microcapsule dispersion containing the following component (A) and component (B), wherein:

the ratio by mass of the content of the component (A) to the content of the component (B) [component (A)/component (B)] is 0.1 or more and 20 or less.

Component (A): microcapsules each having a shell containing silica as a constituent component, and a core containing, inside the shell, at least one organic compound selected from the group consisting of a fragrance material and a fragrance precursor.

Component (B): a surfactant containing a quaternary ammonium salt compound represented by the following general formula (1):

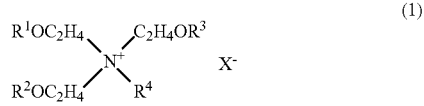

(1)

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and $X^-$ represents an anion, provided that at least one of $R^1$, $R^2$ and $R^3$ is an acyl group derived from a fatty acid having 12 or more and 30 or less carbon atoms.

<17> The aqueous microcapsule dispersion according to the above <16>, wherein the quaternary ammonium salt compound represented by the general formula (1) is preferably liquid within a range of 20° C. or higher and 50° C. or lower.

<18> The aqueous microcapsule dispersion according to the above <16> or <17>, wherein the c Log P value of the organic compound contained in the core of the component (A) is preferably 1 or more, more preferably 2 or more, even more preferably 3 or more, further more preferably 4 or more, and is preferably 30 or less, more preferably 20 or less, even more preferably 10 or less.

<19> The aqueous microcapsule dispersion according to any of the above <16> to <18>, wherein the content of the component (A) in the aqueous microcapsule dispersion is preferably 50% by mass or less, more preferably 40% by mass or less, even more preferably 30% by mass or less, further more preferably 25% by mass or less, and is preferably 3% by mass or more, more preferably 5% by mass or more, even more preferably 8% by mass or more, further more preferably 10% by mass or more, further more preferably 15% by mass or more.

<20> The aqueous microcapsule dispersion according to any of the above <16> to <19>, wherein the content of the component (B) in the aqueous microcapsule dispersion is preferably 40% by mass or less, more preferably 30% by mass or less, even more preferably 20% by mass or less, further more preferably 10% by mass or less, further more preferably 7% by mass or less, further more preferably 5% by mass or less, further more preferably 4% by mass or less, and is preferably 0.1% by mass or more, more preferably 0.5% by mass or more, even more preferably 1% by mass or more, further more preferably 1.5% by mass or more, further more preferably 2% by mass or more.

<21> The aqueous microcapsule dispersion according to any of the above <16> to <20>, wherein the content of the quaternary ammonium salt compound in the aqueous microcapsule dispersion is preferably 40% by mass or less, more preferably 30% by mass or less, even more preferably 20% by mass or less, further more preferably 10% by mass or less, further more preferably 7% by mass or less, further more preferably 5% by mass or less, further more preferably 4% by mass or less, and is preferably 0.1% by mass or more, more preferably 0.5% by mass or more, even more preferably 1% by mass or more, further more preferably 1.5% by mass or more, further more preferably 2% by mass or more.

<22> The aqueous microcapsule dispersion according to any of the above <16> to <21>, wherein the ratio by mass of the content of the component (A) to the content of the component (B) in the aqueous microcapsule dispersion [component (A)/component (B)] is preferably 1 or more, more preferably 2 or more, even more preferably 3 or more, further more preferably 4 or more, further more preferably 5 or more, and is preferably 15 or less, more preferably 12 or less, even more preferably 10 or less, further more preferably 9 or less, further more preferably 8 or less.

<23> The aqueous microcapsule dispersion according to any of the above <16> to <22>, wherein the ratio by mass of the content of the component (A) to the content of the component (B) in the aqueous microcapsule dispersion [component (A)/component (B)] is preferably 1 or more and 15 or less, more preferably 2 or more and 12 or less, even more preferably 2 or more and 10 or less, further more preferably 2 or more and 9 or less, further more preferably 2 or more and 8 or less, further more preferably 3 or more and 8 or less, further more preferably 4 or more and 8 or less, further more preferably 5 or more and 8 or less.

<24> The aqueous microcapsule dispersion according to any of the above <16> to <23>, wherein the viscosity at 25° C. of the aqueous microcapsule dispersion is preferably 1 mPa·s or more, more preferably 5 mPa·s or more, even more preferably 10 mPa·s or more, and is preferably 4,000 mPa·s or less, more preferably 2,000 mPa·s or less, even more preferably 1,000 mPa·s or less, further more preferably 500 mPa·s or less, further more preferably 100 mPa·s or less, further more preferably 50 mPa·s or less, further more preferably 30 mPa·s or less.

<25> A dispersant for microcapsules, containing a surfactant that contains a quaternary ammonium salt compound represented by the following general formula (1):

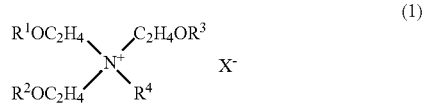

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and $X^-$ represents an anion, provided that at least one of $R^1$, $R^2$ and $R^3$ is an acyl group derived from a fatty acid having 12 or more and 30 or less carbon atoms.

<26> The dispersant for microcapsules according to the above <25>, wherein the quaternary ammonium salt compound is preferably liquid within a range of 20° C. or higher and 50° C. or lower, more preferably liquid within a range of 15° C. or higher and 45° C. or lower, even more preferably liquid within a range of 10° C. or higher and 40° C. or lower, further more preferably liquid within a range of 10° C. or higher and 35° C. or lower.

<27> The dispersant for microcapsules according to the above <25> or <26>, wherein the total ratio of the acyl groups derived from oleic acid, linoleic acid and linolenic acid in all the acyl groups constituting the quaternary ammonium salt compound is preferably 25% by mass or more, more preferably 30% by mass or more, even more preferably 40% by mass or more, further more preferably 50% by mass or more, further more preferably 60% by mass or more, further more preferably 70% by mass or more, further more preferably 80% by mass or more, further more preferably 90% by mass or more, and is preferably 100% by mass or less.

<28> The dispersant for microcapsules according to any of the above <25> to <27>, wherein the proportion of the oleic acid-derived acyl groups in all the acyl groups constituting the quaternary ammonium salt compound is preferably 20% by mass or more, more preferably 30% by mass or more, even more preferably 40% by mass or more, further more preferably 50% by mass or more, further more preferably 60% by mass or more, further more preferably 70% by mass or more, and is preferably 100% by mass or less.

EXAMPLES

Various measurements in Examples and Comparative Examples were according to the following methods.

[Median Diameter $D_{50}$]

The median diameter $D_{50}$ of emulsified drops and the median diameter $D_{50}$ of microcapsules were measured using a laser diffraction/scattering particle size distribution analyzer "LA-950" (trade name by Horiba, Ltd.). The measurement was performed using a flow cell, and water was used as a dispersion medium. A refractive index was set to 1.45-0-i for a dispersoid. An emulsion or an aqueous dispersion containing microcapsules was added to the flow cell, and the measurement was carried out at a concentration at which a transmittance thereof was near 90%, to determine the median diameter $D_{50}$ based on the volume.

[Viscosity at 25° C. of Aqueous Microcapsule Dispersion]

The viscosity of the aqueous microcapsule dispersion was measured using a B-type viscometer (Model; TVB-10, by Toki Sangyo Co., Ltd.). As a spindle, M3 or M4 was used, and the rotation speed was 60 rpm or 6 rpm. The measurement temperature was 25° C.

<Model Fragrance Material>

A model fragrance material A (volume-average c Log P: 3.8. specific gravity: 0.88) having the composition shown in Table 1 was used as the organic compound to be encapsulated in microcapsules. The volume-average c Log P value of the model fragrance material was calculated by multiplying the c Log P values of all the fragrance components in the model fragrance material by the volume ratio thereof in the model fragrance material and summing up the resultant data.

TABLE 1

| Model Fragrance Material A | | |
|---|---|---|
| Fragrance Components | Content (mass %) | cLogP |
| Linalol | 22.0 | 3.3 |
| Linalyl Acetate | 16.2 | 4.4 |
| Tetrahydrolinalol | 16.0 | 3.6 |
| Caryophyllene | 4.5 | 6.3 |
| Coumarin | 4.0 | 1.5 |
| 1,8-Cineol | 3.1 | 3.1 |
| Isobornyl Acetate | 3.0 | 3.9 |
| Ocimene | 2.9 | 4.8 |
| Borneol | 2.6 | 2.9 |
| Nellyl Acetate | 2.2 | 4.5 |
| Others | 23.5 | |

(Synthesis of Silica Capsules)

Synthesis Example 1-1

0.60 g of QUARTAMIN 60W (tradename by Kao Corporation, cetyltrimethylammonium chloride, active ingredient: 30% by mass) was diluted with 89.14 g of ion-exchanged water to give an aqueous phase component. An oily phase component prepared by mixing 24 g of the model fragrance material A and 6 g of tetraethoxysilane (hereinafter also referred to as "TEOS") was added to the aqueous phase component, and the mixture liquid was emulsified using a homomixer (by HsiangTai Corporation, Model; HM310) set at a rotation number of 8,500 rpm, at room temperature (about 25° C.) to give an emulsion. At that time, the median diameter $D_{50}$ of the emulsified drops was 1.1 μm.

Next, the pH of the resultant emulsion was controlled to be 3.8 using an aqueous solution of 0.1 N sodium hydroxide, and then transferred to a separable flask equipped with a stirring blade and a cooler, and while the liquid temperature was kept at 30° C., this was stirred at 200 rpm for 24 hours to give an aqueous dispersion of microcapsules each having a core of the model fragrance material A and a first shell.

Next, 2.7 g of TEOS was dropwise added to 90.0 g of the resultant aqueous dispersion, taking 420 minutes. After the dropwise addition, this was kept stirred for further 17 hours and then cooled to form a second shell to cover the first shell, thereby producing an aqueous dispersion containing 20.8% by mass of silica capsules (A-1) where the model fragrance material A was encapsulated by amorphous silica. The median diameter $D_{50}$ of the silica capsules (A-1) was 2.1 μm. The content of the silica capsules (A-1) in the aqueous dispersion is a calculated value from the formulation in synthesis of the silica capsules.

Synthesis Example 1-2

0.60 g of QUARTAMIN 60W was diluted with 89.14 g of ion-exchanged water to give an aqueous phase component. An oily phase component prepared by mixing 24 g of the model fragrance material A and 6 g of TEOS was added to the aqueous phase component, and the mixture liquid was emulsified using a homomixer (by HsiangTai Corporation, Model; HM310) set at a rotation number of 8,000 rpm, at room temperature (about 25° C.) to give an emulsion. At that time, the median diameter $D_{50}$ of the emulsified drops was 0.8 μm.

Next, the pH of the resultant emulsion was controlled to be 3.7 using an aqueous solution of 1 mass % sulfuric acid, and then transferred to a separable flask equipped with a stirring blade and a cooler, and while the liquid temperature was kept at 30° C., this was stirred at 200 rpm for 24 hours to give an aqueous dispersion containing 21.4% by mass of silica capsules (A-2) each having a core of the model fragrance material A and a shell. The median diameter $D_{50}$ of the silica capsules (A-2) was 1.8 μm. The content of the silica capsules (A-2) in the aqueous dispersion is a calculated value from the formulation in synthesis of the silica capsules.

(Synthesis of Quaternary Ammonium Salt Compound)

Synthesis Example 2-1

A higher fatty acid having the following composition and a triethanolamine were reacted for dehydrating esterification in a ratio of 1.87 mols of the higher fatty acid to 1 mol of the triethanolamine to give an esterification product containing a triethanolamine higher fatty acid ester, a precursor of the quaternary ammonium salt compound represented by the following general formula (I).

The resultant esterification product contained 1% by mass of an unreacted fatty acid.

The esterification product was quaternized using 0.96 equivalents of dimethyl sulfate relative to one equivalent of the amino group of the triethanolamine higher fatty acid ester in the esterification product to give a quaternized product, and then a small amount of ethanol was added thereto.

(Composition of Higher Fatty Acid)
Oleic acid: 80% by mass
Linoleic acid: 10% by mass
Linolenic acid: 2% by mass
Stearic acid: 2% by mass
Palmitic acid: 6% by mass Regarding the higher fatty acid composition, the higher fatty acid used as the raw material was analyzed by gas chromatography, and the area % of each fatty acid was calculated as mass %.

The composition ratio of each component of the resultant quaternized product was analyzed according to an HPLC method, and quantitatively determined using tetraoctylammonium bromide as an internal standard substance. As a result, the resultant quaternized product was identified as containing 66% by mass of a quaternary ammonium salt compound (B-1), 15% by mass of ethanol, 17% by mass of an unreacted amine salt (as methyl sulfate salt), 1% by mass of an unreacted higher fatty acid, and a slight amount of a triethanolamine quaternized product and other minor components.

In these, a component (b1-1) of the general formula (1) where $R^1$ is an acyl group, $R^2$ and $R^3$ are hydrogen atoms, $R^4$ is a methyl group, and $X^-$ is a methyl sulfate ion accounts for 22% by mass in the quaternary ammonium salt compound (B-1), a component (b2-1) of the general formula (1) where $R^1$ and $R^2$ each are an acyl group, $R^3$ is a hydrogen atom, $R^4$ is a methyl group, and $X^-$ is a methyl sulfate ion accounts for 58% by mass in the quaternary ammonium salt compound (B-1) component, and a component (b3-1) of the general formula (1) where $R^1$, $R^2$ and $R^3$ each are an acyl group, $R^4$ is a methyl group, and $X^-$ is a methyl sulfate ion accounts for 20% by mass in the quaternary ammonium salt compound (B-1) component.

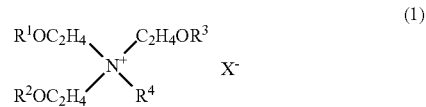

(1)

wherein $R^1$, $R^2$, $R^3$, and $R^4$ are the same as above.

Synthesis Example 2-2

A higher fatty acid having the following composition and a triethanolamine were reacted for dehydrating esterification in a ratio of 1.65 mols of the higher fatty acid to 1 mol of the triethanolamine to give an esterification product containing a triethanolamine higher fatty acid ester, a precursor of the quaternary ammonium salt compound represented by the above-mentioned general formula (1).

The resultant esterification product contained 5% by mass of an unreacted fatty acid.

The esterification product was quaternized using 0.96 equivalents of dimethyl sulfate relative to one equivalent of the amino group of the triethanolamine higher fatty acid ester in the esterification product to give a quaternized product, and then a small amount of ethanol was added thereto.

(Composition of Higher Fatty Acid)
Palmitic acid: 45% by mass
Stearic acid: 25% by mass
Oleic acid: 27% by mass
Linoleic acid: 3% by mass Regarding the higher fatty acid composition, the higher fatty acid used as the raw material was analyzed by gas chromatography, and the area % of each fatty acid was calculated as mass %.

The composition ratio of each component of the resultant quaternized product was analyzed according to an HPLC method, and quantitatively determined using tetraoctylammonium bromide as an internal standard substance. As a result, the resultant quaternized product was identified as containing 86% by mass of a quaternary ammonium salt compound (B-2).

In this, a component (b1-2) of the general formula (1) where $R^1$ is an acyl group, $R^2$ and $R^3$ are hydrogen atoms, $R^4$ is a methyl group, and $X^-$ is a methyl sulfate ion accounts for 23% by mass in the quaternary ammonium salt compound (B-2), a component (b2-2) of the general formula (1) where $R^1$ and $R^2$ each are an acyl group, $R^3$ is a hydrogen atom, $R^4$ is a methyl group, and $X^-$ is a methyl sulfate ion accounts for 49% by mass in the quaternary ammonium salt compound (B-2), and a component (b3-2) of the general formula (1) where R', $R^2$ and $R^3$ each are an acyl group, $R^4$ is a methyl group, and X⁻ is a methyl sulfate ion accounts for 14% by mass in the quaternary ammonium salt compound (B-2) component.

(Production of Aqueous Microcapsule Dispersion)

Examples 1 to 6, 8 and Comparative Examples 1 to 11

The component (A) and the component (B) as a dispersant for microcapsules were mixed at 20 to 25° C. so as to have the composition shown in the following Table 2, thereby preparing an aqueous microcapsule dispersion. The content of the encapsulated model fragrance material A was 13 to 19% by mass.

In Comparative Example 1, the component (B) was not added, and the aqueous dispersion containing the silica capsules (A-1) obtained in Synthesis Example 1-1 was used directly as it was for evaluation of dispersion stability. In Comparative Example 11, the component (B) was not added, and the aqueous dispersion containing the silica capsules (A-2) obtained in Synthesis Example 1-2 was used directly as it was for evaluation of dispersion stability. In Comparative Examples 2 to 5, a polymer dispersant shown in Table 2 was added as the component (B), but immediately after preparation of the aqueous dispersion, silica capsules aggregated, and thereafter, dispersion stability was not evaluated.

The polymer dispersants used in Comparative Examples in Table 2 are shown below.

Hydroxyethyl cellulose: aqueous solution of Natrosol 250HHR (active ingredient content 1%) (by Ashland Corporation)

Cetyl hydroxy cellulose: aqueous solution of Polysurf 67 (active ingredient content 1%) (by Aqualon Group, Hercules Inc.)

Polyvinyl pyrrolidone: aqueous solution of PVP K-30 (active ingredient content 30%) (by FUJIFILM Wako Pure Chemical Corporation)

N-dimethylaminoethyl methacrylate copolymer diethyl sulfate salt: aqueous solution of H.C. Polymer 2 (active ingredient content 1%) (by Osaka Organic Chemical Industry Ltd.)

Polyethylene glycol: PEG13000 (by FUJIFILM Wako Pure Chemical Corporation)

Carboxyvinyl polymer: Carbopol 980 (by The Lubrizol Corporation)

Polydimethylmethylene piperidinium chloride: Merquat 100 (active ingredient content 42%) (by Lubrizol Japan Limited)

Dimethyldiallylammonium chloride/acrylamide copolymer: Merquat 550 (active ingredient content 9%) (by Lubrizol Japan Limited)

Example 7

While 5 g of the aqueous dispersion containing the silica capsules (A-1) obtained in Synthesis Example 1-1 was heated and stirred at 60° C., 0.28 g of an aqueous dispersion containing the quaternary ammonium salt compound (B-2) obtained in Synthesis Example 2-2, which was also heated at 60° C., was added thereto. By cooling as such, an aqueous microcapsule dispersion containing 19.7% by mass of the component (A) and 4.6% by mass of the component (B) was obtained.

[Evaluation of Viscosity of Aqueous Microcapsule Dispersion]

The viscosity at 25° C. of the aqueous microcapsule dispersions obtained in Example 2, Example 5 and Comparative Example 1 was measured, and was 15.7 mPa·s, 24.0 mPa·s, and 9.8 mPa·s, respectively. Thus, all of these were extremely highly flowable aqueous dispersions.

[Evaluation of Dispersion Stability of Microcapsules]

The aqueous microcapsule dispersions obtained in Examples and Comparative Examples were stored at room temperature and 40° C., and checked for gelation, aggregation, floating or precipitation of silica capsules to thereby evaluate the dispersion stability of silica capsules in the aqueous dispersions. Table 2 shows the number of days in which any of gelation, aggregation, floating or precipitation of silica capsules was not observed.

TABLE 2

| | Aqueous Microcapsule Dispersion | | | | Mass Ratio | Evaluation | |
| --- | --- | --- | --- | --- | --- | --- | --- |
| | Component (A) | | Component (B) | | | Dispersion Stability | |
| | Kind | Content (mass %)*1 | Kind | Content (mass %)*1 | [component (A)/ component (B)] | Room temperature | 40° C. |
| Example 1 | silica capsules (A-1) | 20.4 | quaternary ammonium salt compound (B-1) | 1.3 | 15.7 | 5 days | 7 days |
| Example 2 | silica capsules (A-1) | 20.2 | quaternary ammonium salt compound (B-1) | 1.9 | 10.6 | >40 days | 7 days |
| Example 3 | silica capsules (A-1) | 20.0 | quaternary ammonium salt compound (B-1) | 2.5 | 8.0 | >40 days | 28 days |
| Example 4 | silica capsules (A-1) | 19.8 | quaternary ammonium salt compound B-1) | 3.1 | 6.4 | >40 days | 28 days |
| Example 5 | silica capsules (A-1) | 19.2 | quaternary ammonium salt compound (B-1) | 4.9 | 3.9 | >40 days | 7 days |
| Example 6 | silica capsules (A-1) | 18.9 | quaternary ammonium salt compound (B-1) | 6.0 | 3.2 | >40 days | 7 days |
| Example 7 | silica capsules (A-1) | 19.7 | quaternary ammonium salt compound (B-2) | 4.6 | 4.3 | >40 days | 20 days |
| Example 8 | silica capsules (A-2) | 20.4 | quaternary ammonium salt compound (B-1) | 3.3 | 6.2 | >30 days | 7 days |
| Comparative Example 1 | silica capsules (A-1) | 20.8 | — | — | — | <1 day | <1 day |
| Comparative Example 2 | silica capsules (A-1) | 15.6 | hydroxyethyl cellulose | 0.3 | 52.0 | aggregation*2 | |
| Comparative Example 3 | silica capsules (A-1) | 13.9 | cetyl hydroxy cellulose | 0.3 | 46.3 | aggregation*2 | |

TABLE 2-continued

| | Aqueous Microcapsule Dispersion | | | | Mass Ratio | Evaluation | |
|---|---|---|---|---|---|---|---|
| | Component (A) | | Component (B) | | | Dispersion Stability | |
| | Kind | Content (mass %)*1 | Kind | Content (mass %)*1 | [component (A)/ component (B)] | Room temperature | 40° C. |
| Comparative Example 4 | silica capsules (A-1) | 19.5 | polyvinyl pyrrolidone | 1.9 | 10.3 | aggregation*2 | |
| Comparative Example 5 | silica capsules (A-1) | 14.8 | N-dimethylaminoethyl methacrylate copolymer diethyl sulfate salt | 0.3 | 49.3 | aggregation*2 | |
| Comparative Example 6 | silica capsules (A-1) | 20.1 | polyethylene glycol hydroxyethyl cellulose | 1.9 0.3 | 9.1 | <1 day | <1 day |
| Comparative Example 7 | silica capsules (A-1) | 19.6 | carboxyvinyl polymer | 0.1 | 196 | <1 day | — |
| Comparative Example 8 | silica capsules (A-1) | 20.4 | polydimethylmethylene piperidinium chloride | 0.8 | 25.5 | <1 day | — |
| Comparative Example 9 | silica capsules (A-1) | 19.8 | dimethyldiallylammonium chloride/acrylamide copolymer | 0.4 | 49.5 | <1 day | — |
| Comparative Example 10 | silica capsules (A-1) | 17.8 | dimethyldiallylammonium chloride/acrylamide copolymer hydroxyethyl cellulose | 0.4 0.1 | 35.6 | <4 days | — |
| Comparative Example 11 | silica capsules (A-2) | 21.4 | — | — | — | <4 days | <1 day |

*1Content of each active ingredient in aqueous microcapsule dispersion (mass %).
*2Immediately after preparation, the aqueous microcapsule dispersion aggregated, and was not evaluated for dispersion stability in the subsequent storage period.

From Table 2, it is known that the aqueous microcapsule dispersions of Examples contain a specific quaternary ammonium salt compound and therefore have high dispersion stability, as compared with those of Comparative Examples. Comparative Examples contain various polymer dispersants that are used as a thickener, but could not have good dispersion stability.

Consequently, the present invention can improve the dispersion stability of aqueous microcapsule dispersions, and therefore in the case where a synthetic polymer is not used as a thickener, the present invention can reduce the load to environments in afterwards applying aqueous microcapsule dispersions to various liquid compositions or discarding them.

[Evaluation of Retentiveness of Fragrance Component at High Temperatures]

The aqueous microcapsule dispersions prepared in Example 5 and Comparative Example 1 each was sealed in a screw tube and then left as such at 50° C. After left as such, the screw tubes were stored for 8 hours and 32 hours, and thereafter the aqueous microcapsule dispersion was scooped out of each tube, then 20 mg thereof was accurately weighed, diluted with 50 g of ion-exchanged water, and thereafter made to pass through a membrane filter (by Millipore Corporation, tradename "Omnipore", Model Code "JAWP04700) to thereby collect silica capsules on the membrane filter.

Further, on the membrane filter, the silica capsules were washed with 10 mL of ion-exchanged water and then 10 mL of hexane, and thereafter the silica capsules were immersed in 10 mL of methanol containing an internal standard, tridecane in a concentration of 10 μg/ml, and irradiated with ultrasonic waves for 60 minutes using an ultrasonic irradiator (by Branson Corporation, Model "5510") under the condition of an output of 180 W and an oscillation frequency of 42 kHz to thereby elute the fragrance material from the silica capsules. The solution was again made to pass through a membrane filter (by Toyo Roshi Kaisha, Ltd., tradename "DISMIC", Model Code "13JP020AN"), and thereafter the fragrance component contained in the solution was identified through gas chromatography to determine the amount α of the fragrance component encapsulated in the silica capsules.

In addition, 20 mg of the aqueous microcapsule dispersion prepared in Example 5 and Comparative Example 1 but not stored at 50° C. was accurately weighed, immersed in 10 mL of methanol, and irradiated with ultrasonic waves for 60 minutes using an ultrasonic irradiator under the condition of an output of 180 W and an oscillation frequency of 42 kHz to thereby elute the fragrance material from the silica capsules. The solution was made to pass through a membrane filter (by Toyo Roshi Kaisha, Ltd., tradename "DISMIC", Model Code "13JP020AN"), and thereafter the fragrance component contained in the solution was identified through gas chromatography to determine the amount β of the fragrance component contained in the aqueous microcapsule dispersion.

Linalol and tetrahydrolinalol contained in the model fragrance material A were combined to be linalols, and the retentiveness of the linalols was determined according to the following formula. The evaluation results are shown in the following Table 3.

Linalols Retentiveness (%)={(amount α of linalols encapsulated in silica capsules after storage)/ (amount β of linalols contained in aqueous microcapsule dispersion)}×100

TABLE 3

| | Linalols Retentiveness (%) | | |
|---|---|---|---|
| | before storing at 50° C. | After stored at 50° C. for 8 hours | After stored at 50° C. for 32 hours |
| Example 5 | 94 | 94 | 93 |
| Comparative Example 1 | 94 | 70 | 70 |

From Table 3, it is known that the aqueous microcapsule dispersion of Example is excellent in retentiveness of the encapsulated fragrance component at high temperatures, as compared with that of Comparative Example.

INDUSTRIAL APPLICABILITY

The aqueous microcapsule dispersion of the present invention can be stored in a state where the dispersion stability of the microcapsules therein is maintained in a good condition. Consequently, the aqueous microcapsule dispersion of the present invention can be easily handled with no viscosity increase owing to gelation or aggregation in imparting various functions including fragrance impartation to various products such as laundry products, personal care products, cosmetics and liquid products for household use, and can be widely utilized. In addition, the component (B) used in the aqueous dispersion can improve dispersion stability of microcapsules and is therefore especially useful as a dispersant for microcapsules.

The invention claimed is:

1. An aqueous microcapsule dispersion comprising the following component (A) and component (B), wherein:
the content of the component (A) is 5% by mass or more,
the ratio by mass of the content of the component (A) to the content of the component (B) [component (A)/component (B)] is 3 or more and 20 or less,
Component (A): microcapsules each having a shell that comprises silica as a constituent component and a core comprising at least one organic compound inside the shell,
Component (B): a surfactant comprising a quaternary ammonium salt compound represented by the following general formula (1):

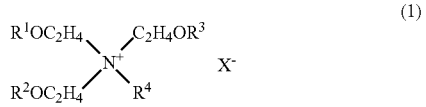
(1)

wherein $R^1$, $R^2$ and $R^3$ each independently represent an acyl group derived from a fatty acid having 12 or more and 30 or less carbon atoms, or a hydrogen atom, $R^4$ represents an alkyl group having 1 or more and 3 or less carbon atoms, and X- represents an anion, provided that at least one of $R^1$, $R^2$ and $R^3$ is an acyl group derived from a fatty acid having 12 or more and 30 or less carbon atoms.

2. The aqueous microcapsule dispersion according to claim 1, wherein the quaternary ammonium salt is liquid within a range of 10° C. or higher and 40° C. or lower.

3. The aqueous microcapsule dispersion according to claim 1, wherein the total ratio of the acyl groups derived from oleic acid, linoleic acid and linolenic acid in all the acyl groups constituting the quaternary ammonium salt compound is 60% by mass or more and 100% by mass or less.

4. The aqueous microcapsule dispersion according to claim 1, wherein the proportion of the acyl groups derived from oleic acid in all the acyl groups constituting the quaternary ammonium salt compound is 50% by mass or more.

5. The aqueous microcapsule dispersion according to claim 1, wherein the content of the component (B) in the aqueous microcapsule dispersion is 10% by mass or less.

6. The aqueous microcapsule dispersion according to claim 1, wherein the content of the component (A) in the aqueous microcapsule dispersion is 5% by mass or more and 50% by mass or less.

7. The aqueous microcapsule dispersion according to claim 1, wherein the content of the quaternary ammonium salt compound in the aqueous microcapsule dispersion is 0.1% by mass or more and 10% by mass or less.

8. The aqueous microcapsule dispersion according to claim 1, wherein the viscosity at 25° C. of the aqueous microcapsule dispersion is 1 mPa·s or more and 500 mPa·s or less.

9. The aqueous microcapsule dispersion according to claim 1, wherein the median diameter $D_{50}$ of the microcapsules of the component (A) is 0.1 μm or more and 50 μm or less.

10. The aqueous microcapsule dispersion according to claim 1, wherein the organic compound is at least one material selected from the group consisting of a fragrance material, a fragrance precursor, an oil, an antioxidant and a solvent.

* * * * *